(12) United States Patent
Gauthier et al.

(10) Patent No.: US 6,975,057 B2
(45) Date of Patent: Dec. 13, 2005

(54) ROTARY ELECTRIC MACHINE HAVING A STATOR MADE UP OF SECTORS ASSEMBLED TOGETHER

(75) Inventors: Pascal Gauthier, Asnieres-sur-Nouere (FR); Eric Coupart, Angouleme (FR); Jacques Saint-Michel, Angouleme (FR); Christophe Gilles, Angouleme (FR)

(73) Assignee: Moteurs Leroy-Somer, Angouleme (FR)

(*) Notice: Subject to any disclaimer, the term of this patent is extended or adjusted under 35 U.S.C. 154(b) by 0 days.

(21) Appl. No.: 10/115,910

(22) Filed: Apr. 5, 2002

(65) Prior Publication Data

US 2002/0163278 A1 Nov. 7, 2002

(30) Foreign Application Priority Data

Apr. 17, 2001 (FR) .............................. 01 05189

(51) Int. Cl.$^7$ .......................... H02K 1/18; H02K 1/16; H02K 21/16
(52) U.S. Cl. ....................... 310/218; 310/215; 310/216; 310/217; 310/258; 310/259; 310/261; 310/262
(58) Field of Search ................................ 310/215–218, 310/258–259, 156.44

(56) References Cited

U.S. PATENT DOCUMENTS

| 871,758 A | 11/1907 | Heitmann et al. |
|---|---|---|
| 1,045,159 A | 11/1912 | Lundell |
| 1,375,699 A | 4/1921 | Ilg |
| 2,386,673 A | 10/1945 | Fisher |
| 2,719,931 A | 10/1955 | Kober |
| 3,072,813 A | 1/1963 | Reijnst et al. |
| 3,083,311 A | 3/1963 | Krasnow |
| 3,158,770 A | 11/1964 | Coggeshall et al. |
| 3,237,034 A | 2/1966 | Krasnow |
| 3,270,264 A | 8/1966 | Miner |
| 3,281,655 A | 10/1966 | Blasingame |
| 3,334,254 A | 8/1967 | Kober |
| 3,594,597 A | 7/1971 | Kildishev et al. |
| 3,671,788 A | 6/1972 | Knudson et al. |
| 3,701,405 A | 10/1972 | Fougere ..................... 194/101 |

(Continued)

FOREIGN PATENT DOCUMENTS

| DE | 700 420 C | 11/1940 |
|---|---|---|
| DE | 195 03 610 A1 | 8/1996 |
| DE | 199 03 409 C1 | 7/2000 |
| EP | 0 143 693 | 6/1985 |
| EP | 0 327 470 | 8/1989 |
| EP | 0 365 689 A1 | 5/1990 |
| EP | 0 438 594 A1 | 7/1991 |
| EP | 0 669 699 A1 | 8/1995 |
| EP | 0 777 312 A2 | 6/1997 |
| EP | 0 823 771 A1 | 2/1998 |
| EP | 0 866 540 A2 | 9/1998 |
| EP | 0 872 943 A1 | 10/1998 |
| EP | 0 909 009 A1 | 4/1999 |
| EP | 1 010 660 A1 | 6/2000 |
| EP | 1 050 948 A2 | 11/2000 |

(Continued)

OTHER PUBLICATIONS

JR Hendershot, Design of Brushless Permanent Magnet Motors, 1994, Chapter 3, pp. 3.1–3.74.*
U.S. Appl. No. 09/843,808, filed Apr. 2001, Coupart et al.
U.S. Appl. No. 10/117,031, filed Apr. 2002, Gauthier et al.
U.S. Appl. No. 10/115,958, filed Apr. 2002, Eydelie et al.
U.S. Appl. No. 10/121,577, filed Apr. 2002, Coupart et al.

*Primary Examiner*—Darren Schuberg
*Assistant Examiner*—J. Aguirrechea
(74) *Attorney, Agent, or Firm*—Oliff & Berridge, PLC

(57) ABSTRACT

The invention relates to a rotary electric machine including a stator, powered by a polyphase current, having a magnetic circuit with teeth forming intervening slots for receiving electrical conductors. The magnetic circuit is made up of an assembly of sectors defining air-gaps intersecting the teeth at half-width.

15 Claims, 2 Drawing Sheets

U.S. PATENT DOCUMENTS

| | | | | |
|---|---|---|---|---|
| 3,736,449 | A | 5/1973 | Honeywell et al. | 310/171 |
| 3,760,208 | A | 9/1973 | Hamon | 310/49 |
| 3,806,744 | A | 4/1974 | Abraham et al. | 310/49 |
| 3,879,737 | A | 4/1975 | Lunde | |
| 3,889,140 | A | 6/1975 | Baermann | |
| 3,979,821 | A | 9/1976 | Noodleman | 29/598 |
| RE29,090 | E | 12/1976 | Fougere | 194/99 |
| 4,039,908 | A | 8/1977 | Maeder | 318/166 |
| 4,072,315 | A | 2/1978 | Tsujihara et al. | 274/1 E |
| 4,080,724 | A * | 3/1978 | Gillette | 29/598 |
| 4,117,360 | A | 9/1978 | Richter | |
| 4,160,926 | A | 7/1979 | Cope et al. | |
| 4,219,752 | A | 8/1980 | Katou | |
| 4,243,903 | A | 1/1981 | Mishima | 310/154.43 |
| 4,302,693 | A | 11/1981 | Burgmeier et al. | |
| 4,339,874 | A | 7/1982 | McCarty et al. | |
| 4,355,785 | A | 10/1982 | Tosato et al. | 254/362 |
| 4,425,521 | A | 1/1984 | Rosenberry, Jr. et al. | |
| 4,445,103 | A | 4/1984 | Chass | 336/135 |
| 4,459,500 | A | 7/1984 | Miyamoto | |
| 4,617,725 | A | 10/1986 | Holter et al. | |
| 4,618,792 | A | 10/1986 | Yates | |
| 4,688,951 | A | 8/1987 | Guers | |
| 4,771,197 | A | 9/1988 | Ivanto et al. | 310/67 R |
| 4,774,424 | A | 9/1988 | Habermann | |
| 4,883,981 | A | 11/1989 | Gerfast | |
| 4,896,839 | A | 1/1990 | Curtis, Jr. et al. | |
| 5,013,953 | A | 5/1991 | Odell | 310/254 |
| 5,047,681 | A | 9/1991 | Gaillard et al. | |
| 5,066,880 | A | 11/1991 | Banon | 310/156.55 |
| 5,091,668 | A | 2/1992 | Cuenot et al. | |
| 5,109,172 | A | 4/1992 | Pace | 310/154.43 |
| 5,162,686 | A | 11/1992 | Royer | |
| 5,177,391 | A | 1/1993 | Kusase | 310/263 |
| 5,214,839 | A * | 6/1993 | Rieber et al. | 29/596 |
| 5,254,914 | A * | 10/1993 | Dunfield et al. | 318/254 |
| 5,266,914 | A | 11/1993 | Dickson et al. | 335/288 |
| 5,270,645 | A | 12/1993 | Wheeler et al. | |
| 5,327,069 | A | 7/1994 | Radun et al. | 322/10 |
| 5,386,162 | A * | 1/1995 | Horst | 310/51 |
| 5,583,387 | A * | 12/1996 | Takeuchi et al. | 310/217 |
| 5,642,013 | A | 6/1997 | Wavre | |
| 5,723,931 | A | 3/1998 | Andrey | 310/179 |
| 5,729,072 | A | 3/1998 | Hirano et al. | |
| 5,744,888 | A | 4/1998 | Zajc et al. | |
| 5,744,894 | A | 4/1998 | Cho et al. | |
| 5,747,909 | A | 5/1998 | Syverson et al. | |
| 5,760,503 | A | 6/1998 | Tsuchida et al. | |
| 5,767,601 | A | 6/1998 | Uchiyama | 310/190 |
| 5,828,147 | A | 10/1998 | Best et al. | |
| 5,829,120 | A | 11/1998 | Uchida et al. | |
| 5,838,086 | A | 11/1998 | Cuenot et al. | |
| 5,841,212 | A | 11/1998 | Mita et al. | |
| 5,864,192 | A | 1/1999 | Nagate et al. | |
| 5,880,549 | A | 3/1999 | Chiba et al. | 310/168 |
| 5,909,071 | A | 6/1999 | Sakuma et al. | 310/51 |
| 5,909,072 | A | 6/1999 | Muller | |
| 5,917,263 | A | 6/1999 | Sakuma et al. | 310/261 |
| 5,939,810 | A | 8/1999 | Uchida et al. | |
| 5,965,967 | A | 10/1999 | Liang et al. | |
| 5,969,454 | A | 10/1999 | Pengov et al. | 310/162 |
| 6,011,339 | A | 1/2000 | Kawakami | |
| 6,013,962 | A | 1/2000 | Nashiki | |
| 6,013,963 | A | 1/2000 | Shelton, Jr. | 310/179 |
| 6,025,665 | A | 2/2000 | Poag et al. | |
| 6,028,385 | A | 2/2000 | Pengov et al. | 310/166 |
| 6,031,311 | A | 2/2000 | Lee | |
| 6,049,153 | A * | 4/2000 | Nishiyama et al. | 310/156.53 |
| 6,097,120 | A | 8/2000 | Horng | |
| 6,144,132 | A | 11/2000 | Nashiki | |
| 6,175,177 | B1 | 1/2001 | Sabinski et al. | 310/156.55 |
| 6,194,805 | B1 | 2/2001 | Heese et al. | 310/166 |
| 6,204,626 | B1 * | 3/2001 | Nakamura | 318/700 |
| 6,232,691 | B1 | 5/2001 | Anderson | |
| 6,249,067 | B1 | 6/2001 | Schob et al. | 310/68 B |
| 6,271,613 | B1 | 8/2001 | Akemakou et al. | 310/181 |
| 6,313,558 | B1 | 11/2001 | Abukawa et al. | |
| 6,335,582 | B1 | 1/2002 | Abukawa et al. | |
| 6,340,857 | B2 | 1/2002 | Nishiyama et al. | 310/156.53 |
| 6,355,996 | B1 | 3/2002 | Birkestrand | 310/54 |
| 6,369,473 | B1 | 4/2002 | Baumeister et al. | |
| 6,388,346 | B1 | 5/2002 | Lopatinsky et al. | |
| 6,396,181 | B1 | 5/2002 | Akemakou | |
| 6,400,059 | B1 | 6/2002 | Hsu | |
| 6,441,525 | B1 | 8/2002 | Koharagi et al. | |
| 6,448,673 | B1 | 9/2002 | Brown et al. | |
| 6,518,750 | B1 | 2/2003 | Lin et al. | 324/207.2 |
| 6,525,442 | B2 | 2/2003 | Senoh et al. | |
| 6,531,797 | B2 * | 3/2003 | Eydelie et al. | 310/71 |
| 6,559,567 | B2 | 5/2003 | Schob | 310/90.5 |
| 6,570,288 | B1 | 5/2003 | Kaizuka et al. | 310/156.55 |
| 6,573,629 | B1 * | 6/2003 | Morimatsu | 310/166 |
| 6,661,137 | B2 | 12/2003 | Gauthier | 310/75 R |
| 6,703,747 | B2 | 3/2004 | Kawamura | 310/179 |
| 6,724,114 | B2 * | 4/2004 | Horst | 310/154.11 |
| 6,727,618 | B1 | 4/2004 | Morrison | 310/90.5 |

FOREIGN PATENT DOCUMENTS

| | | | | |
|---|---|---|---|---|
| FR | 2 655 784 | | 6/1991 | |
| FR | 2 784 815 A1 | | 4/2000 | |
| GB | 258 981 A | | 10/1926 | |
| GB | 0258981 A | * | 10/1926 | |
| JP | U-58-136954 | | 9/1983 | H02K/5/22 |
| JP | A 60-234451 | | 11/1985 | |
| JP | 63144731 A | * | 6/1988 | H02K/1/16 |
| JP | 2-97262 | | 4/1990 | |
| JP | A 4-33551 | | 2/1992 | H02K/21/22 |
| JP | A-6-311679 | | 11/1994 | H02K/1/27 |
| JP | A 7-107707 | | 4/1995 | |
| JP | A 7-264822 | | 10/1995 | |
| JP | A 9-322455 | | 12/1997 | |
| JP | A 10-126990 | | 5/1998 | |
| JP | A 10-146030 | | 5/1998 | |
| JP | A 10-164807 | | 6/1998 | H02K/21/16 |
| JP | 10-234147 | | 9/1998 | |
| JP | 11-4553 | | 1/1999 | |
| JP | A-11-113206 | | 4/1999 | H02K/3/34 |
| JP | U-1-96778 | | 6/1999 | H02K/29/08 |
| JP | A 2000-152537 | | 5/2000 | |
| JP | A 2000-333407 | | 11/2000 | |
| JP | A 2002-10606 | | 1/2002 | H02K/29/00 |

\* cited by examiner

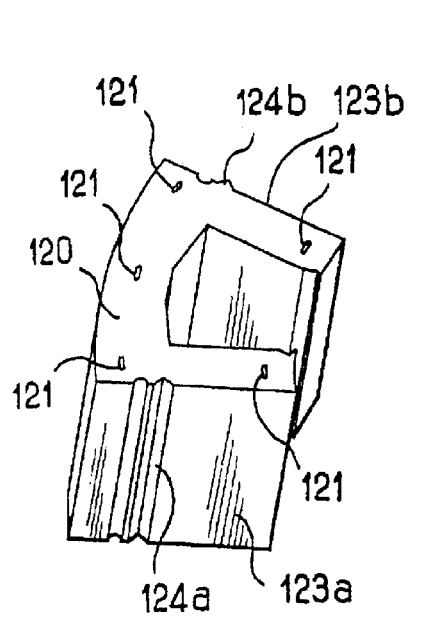
FIG._4
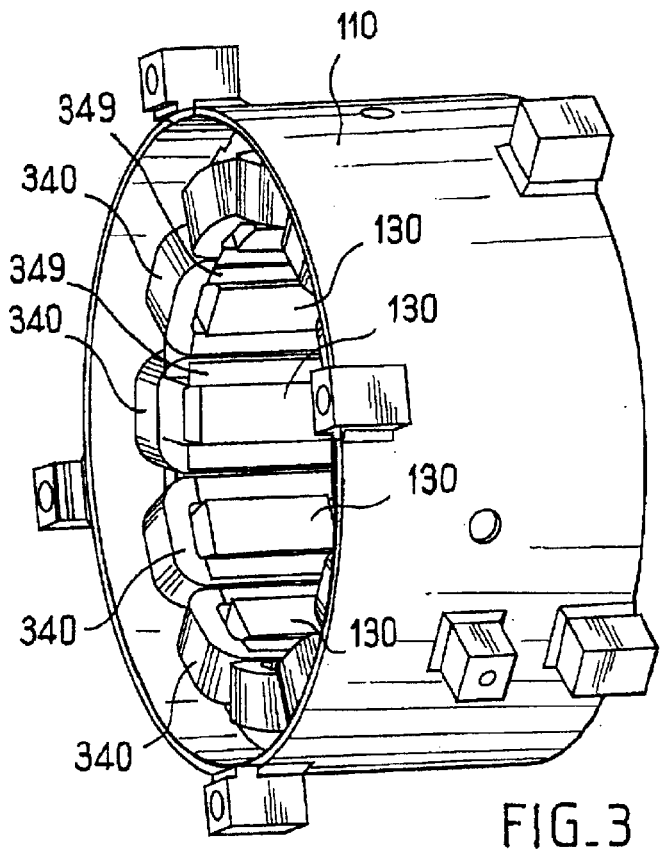
FIG._3
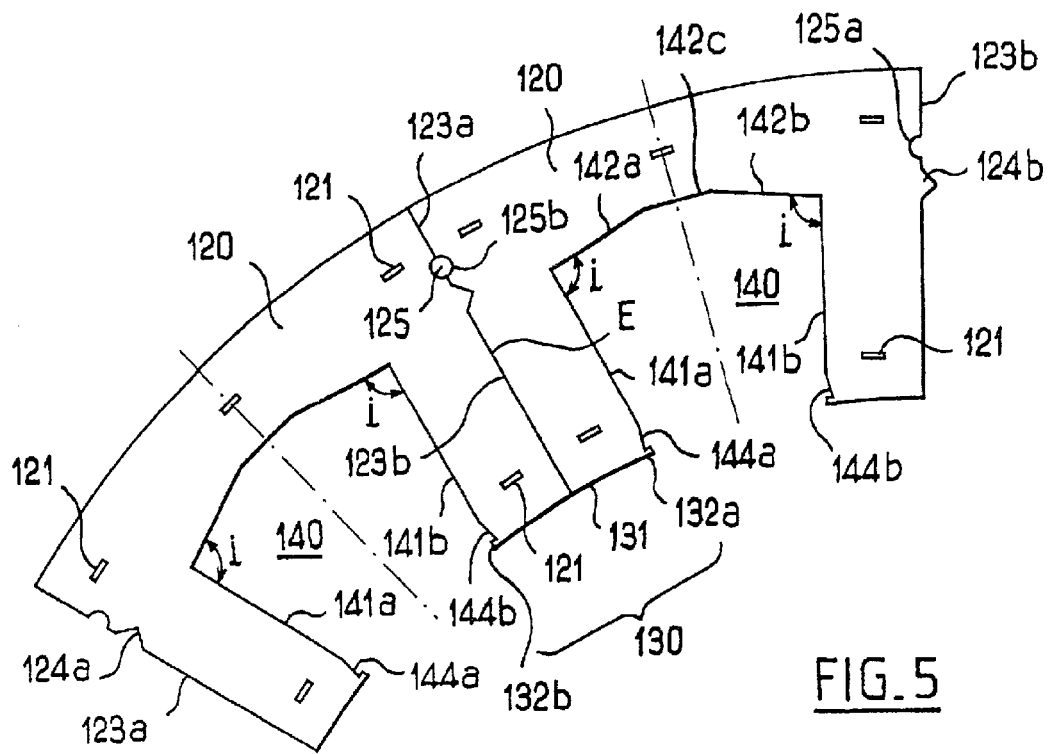
FIG._5

ROTARY ELECTRIC MACHINE HAVING A STATOR MADE UP OF SECTORS ASSEMBLED TOGETHER

The present invention relates to rotary electric machines and more particularly, but not exclusively, to stators for synchronous motors.

The invention seeks in particular to improve the electrical performances of machines including a stator with windings on teeth. In a stator with windings on teeth, each tooth serves as the core of a winding. In addition, the number of teeth $n_{teeth}$ is preferably a function of the number of pairs of poles $n_{pairs}$ and the number of phases $n_{phases}$ in compliance with the relationship $n_{teeth}=n_{pairs}*n_{phases}$.

BACKGROUND OF THE INVENTION

In many known rotary machines, the magnetic circuit of the stator is formed by superposing magnetic laminations that are generally annular in shape, each lamination being made by being cut out, with teeth defining intervening slots for passing electrical conductors of a primary or a secondary magnetic circuit.

Application EP-A-0 823 771 describes a stator having one winding on each tooth. The magnetic circuit of the stator is made up by assembling together sectors which define airgaps halfway across the slots. Subdividing the stator into sectors weakens the stator since the bearing surfaces between the sectors are relatively narrow. Furthermore, the magnetic flux passes through as many air-gaps as there are sectors, thereby reducing the efficiency of the machine.

OBJECTS AND SUMMARY OF THE INVENTION

The invention provides a rotary electric machine which includes a stator, powered by a polyphase current, having a magnetic circuit with teeth forming intervening slots for receiving electric conductors, wherein said magnetic circuit is made up of an assembly of sectors defining air-gaps intersecting said teeth at half-width.

The magnetic flux which flows from one half tooth to another along a same sector does not encounter an airgap, thereby not generating magnetic losses.

In addition, the sectors may be made with elements that are cut out practically without scrap using cutting tools of relatively small size, i.e. tools capable of high rates of throughput.

In addition, the bearing surfaces may be larger in size than when the air-gaps are situated at slot half-width, as applies in particular to the machine described in application EP-A-0 823 771. This may make it possible to hold the sectors better and may make it possible to ensure that they remain cohesive merely by being forced into a cylindrical case.

The invention is particularly suitable for machines in which each tooth serves as a core to an individual coil, and in particular, for synchronous motors having a stator with windings on teeth, and having permanent magnet rotors with flux concentration. In such machines, the number of teeth and the number of coils is relatively small, thereby reducing the cost of manufacture.

In a preferred embodiment of the invention, the stator has six or more teeth.

Advantageously, each sector has respective portions in relief that are suitable for co-operating with complementary portions in relief of adjacent sectors, thereby making it easier to mount the sectors and enabling them to hold together better.

In a particular embodiment, the magnetic circuit of the stator is inserted by force into a cylindrical case which induces radial compression forces on the sectors in order to hold them together.

When the stator receives an individual coil on each tooth, each tooth preferably presents a non-constant width so as to enable the coil to lock to some extent on the tooth. Such locking is advantageous not only while the coils are being mounted on the magnetic circuit of the stator while the machine is being made, but also while a coil is being replaced without reimpregnating the stator. The machine having a rotor, each tooth preferably has opposite sides which diverge going away from the rotor over at least a major portion of their length starting from their free ends, in order to enable the above-mentioned locking. In addition, another advantage of having teeth of width that increases starting at a certain distance from their free ends going away from the rotor lies in the greater section offered to the magnetic field lines reducing the risk of the magnetic laminations becoming saturated. This makes it possible to use a magnetic material that is less expensive.

In a particular embodiment, the teeth do not have pole shoes, thereby enabling the individual coils to be put into place easily.

Advantageously, in the vicinity of their free ends, the teeth include slots for mounting pieces of locking shim for locking the coils engaged on the teeth.

Advantageously, the length of the teeth is greater than the width of the yoke.

BRIEF DESCRIPTION OF THE DRAWINGS

Other characteristics and advantages of the present invention will appear on reading the following detailed description of non-limiting embodiments of the invention, and on examining the accompanying drawings, which drawings form an integral portion of the description, and in which:

FIG. 3 shows the stator in isolation, in perspective, and in diagrammatic manner;

FIG. 4 shows a sector of the magnetic circuit of the stator in isolation and in perspective; and FIG. 5 shows how the FIG. 4 sector is assembled with an identical sector.

MORE DETAILED DESCRIPTION

Figure 1:
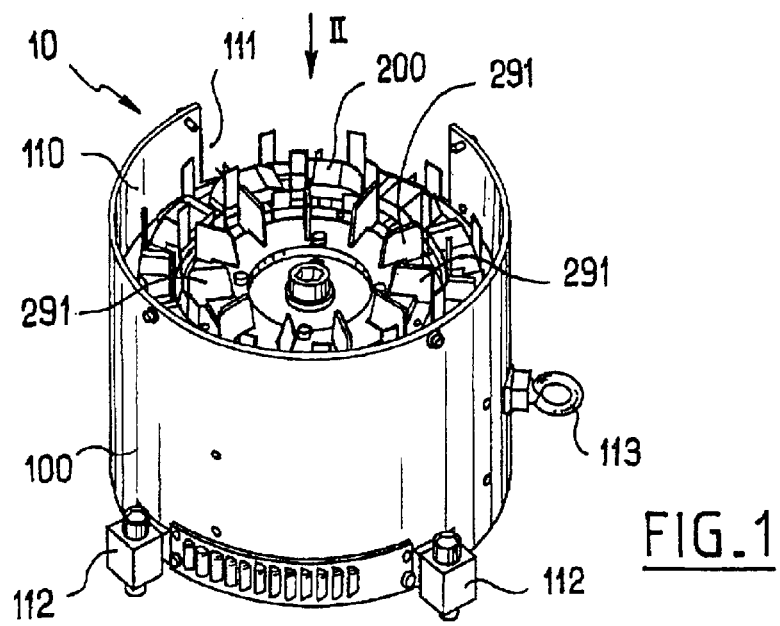
FIG. 1 is a diagrammatic perspective view of a synchronous motor constituting an embodiment of the invention.
Figure 2:
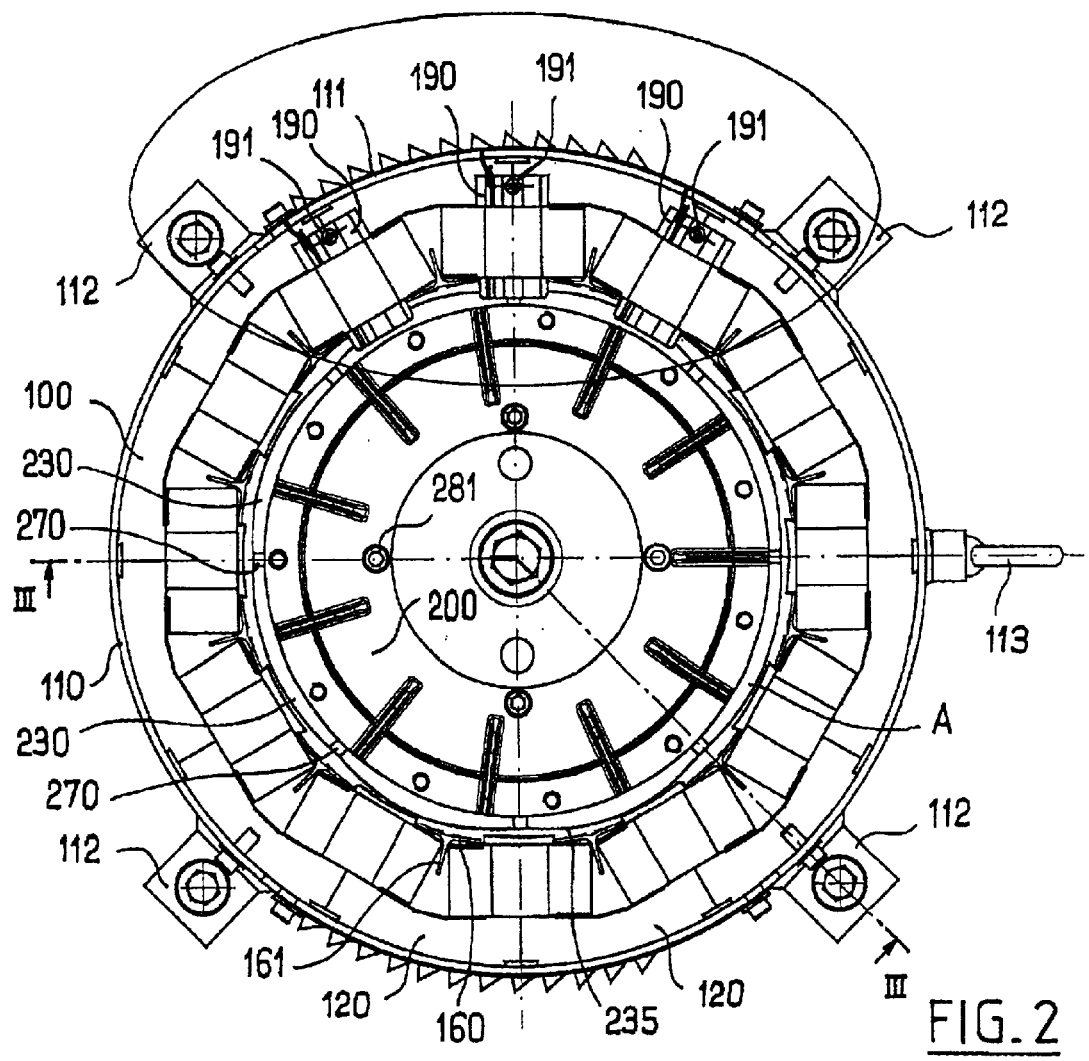
FIG. 2 is a diagrammatic plan view looking along arrow II of FIG. 1.

FIGS. 1 and 2 show a synchronous motor 10 of the invention comprising a stator 100 and a rotor 200. The motor 10 is brushless, it has a flux-concentrating rotor, and its stator has windings on teeth, and it operates on three-phase AC.

The stator 100 has a steel case 110 with a lateral opening 111 in particular for passing electrical conductors for powering the stator windings. On the outside, the case 110 is provided with fixing tabs 112 and with a hook 113 for hoisting purposes.

In the example shown, the stator 100 has a magnetic circuit that comprises a plurality of identical sectors 120, one of which is shown in isolation, in perspective in FIG. 4.

Each sector 120 is constituted by a stack of identical magnetic laminations that are superposed and clipped together so as to constitute a unitary assembly, with clipping being obtained using a conventional technique whereby each lamination is subjected to spot deformation at a plurality of assembly points 121. Using a stack of magnetic laminations serves to limit losses due to induced currents. When assembled together, two adjacent sectors 120 form a tooth 130, which tooth is used for receiving an individual coil 340, as can be seen in FIG. 5 in particular. The number of teeth $n_{teeth}$ in the example described is twelve, and the motor is designed to be powered with three-phase AC and the rotor has 8 poles. Naturally, the number of rotor poles could be different and in particular equal to 12 or 16, for example. The stator could also have a number of stator teeth that is not associated with the number of rotor pole pairs $n_{pairs}$ and the number of phases $n_{phases}$ by the relationship $n_{teeth} = n_{pairs} * n_{phases}$.

On its sides 123a and 123b for co-operating with adjacent sectors 120, each sector 120 has respective portions in relief 124a and 124b. These portions in relief 124a and 124b are complementary in shape having a profile that is generally triangular when seen from above, one being recessed and the other projecting, and having two sides that are substantially rectilinear and interconnected by a rounded portion. Co-operation between the portions in relief 124a and 124b contributes to positioning the sectors 120 properly relative to one another while assembling the magnetic circuit of the stator. Each sector 120 also has respective grooves 125a and 125b in its sides 123a and 123b, each groove being of semicircular cross-section and situated in the vicinity of the portions in relief 124a and 124b so that two adjacent grooves together form a hole 125 of circular section when the sectors 120 are assembled together. These holes 125 serve for receiving three detectors 190 as described in greater detail below.

In FIG. 5, it will be observed that the air-gap E at the interface between two adjacent sectors 120 occupies the middle of the corresponding tooth 130, thereby enabling magnetic losses to be reduced while the machine is in operation since magnetic flux can flow from one-half tooth to the adjacent half-tooth within the same sector 120 without encountering an air-gap.

The sectors 120 are forced as a whole into the cylindrical case 110, and the magnetic circuit formed by the sectors 120 is held together by the radial compression forces exerted by the case 110 on the sectors 120.

Each sector 120 defines a slot 140 whose opposite sides 141a and 141b are at an angle i of more than 90° relative to the adjacent regions 142a and 142b of the bottom of the slot 140, which regions are themselves perpendicular to radii passing through the line where the corresponding tooth meets the bottom of the slot. In the embodiment shown, the angle i is 90.4°, but this value is merely an example.

Each of the sides 123a and 123b of the sectors is generally in alignment with a radius, ignoring the portions in relief 124a, 124b, 125a, and 125b, and the width of each tooth 130 increases perceptibly on going away from the rotor (ignoring the cutouts 144a or 144b formed close to its free end 131 facing the rotor).

It will be observed on examining FIG. 5 that in the vicinity of its free end 131 each tooth 130 does not have pole shoes, in contrast to many known stators. The free end 131 is a circularly cylindrical portion on the same axis as the axis of rotation of the rotor, and it is concave towards the rotor.

In the example shown, the end portions 132a and 132b of each tooth 130 situated between the free end 131 and the cutouts 144a or 144b are in alignment with the sides 141a and 141b respectively.

The bottom of each slot includes a middle region 142c interconnecting the regions 142a and 142b and perpendicular to a radius intersecting the slot 140 at half-width, as represented by chain-dotted lines in FIG. 5.

As mentioned above, each tooth 130 receives an individual coil 340 occupying substantially half of the volume of each of the slots 140 adjacent to the tooth 130 in question.

As more and more coils 340 are mounted on the teeth 130, pieces of support shim 160 are slid into the cutouts 144a, 144b so as to close off the slots 140. As can be seen in FIG. 2, these pieces of shim 160 include partitions 161 extending between the portions of the two coils 340 that are received in the corresponding slot 140. Insulation sheets 349 are interposed between the slots 140 and the coils 340.

The convergence of the sides 141a and 141b of the tooth 130 towards the rotor and the corresponding shape of the inside section of the coil contribute to preventing the coil from moving on the tooth 130. A repair can be performed on site without it being necessary to return the machine to the manufacturer, and without it being necessary to re-impregnate the stator, thus making it possible to shorten repair time. The motor 10 can advantageously be shipped together with one or more replacement coils 340.

The rotor 200 is a flux-concentrating rotor and includes magnets 270 disposed between the pole pieces 230.

An annular zone A is provided around a cheek-plate fixed on the rotor, in which it is possible to read the magnetic field of the magnets 270 of the rotor by means of detectors 190 of the kind shown in FIG. 2.

In the embodiment described, there are three detectors 190, since the motor is a three-phase motor, with each detector comprising a Hall effect sensor arranged to detect the magnetic field over the peripheral region A of the rotor 200 around an end cheek-plate of the rotor. The magnetic field is read along an axis parallel to the axis of rotation of the rotor, the Hall effect sensor overlapping the peripheral region A. In the example shown, the detectors 190 are mounted on three consecutive teeth 130 situated in the vicinity of the opening 111.

Each detector 190 is fixed by a screw 191 on a tooth 130 of the stator, said screw 191 being engaged in a hole 125. Each detector 190 extends along the radial axis $Z_u$, $Z_v$, or $Z_w$ of the associated tooth and passes through the coil 340 engaged on that tooth. The coils 340 are provided for this purpose with an inside section of length that is large enough to enable the detector 190 to be passed. The space left between a coil and the corresponding tooth for passing the detector can be about 5 mm, for example, with such a space serving to insulate the coil from the tooth where there is no insulation 349.

It is advantageous to read the magnetic field of the permanent magnets 270 directly because that makes it possible to avoid adding special elements to the rotor whose sole purpose is to enable the angular position of the rotor to be read. This simplifies manufacture of the rotor and improves reliability. In addition, mounting detectors 190 in the gap between the coils 340 and the teeth 130 is particularly compact, while nevertheless providing easy access to the detectors 190 in order to replace them, should that be necessary.

Each detector 190 is positioned inside a coil 340 of given phase (u, v, and w). Each detector 190 makes it possible to detect which polarity of the rotor lies in register with the associated coil (and thus the corresponding phase) at a given instant. Each detector 190 delivers a high signal or a low signal depending on the polarity it detects. Each detector 190 has an electronic circuit for shaping the signals delivered by the Hall effect sensors so as to reduce sensitivity to interference. Depending on the position of the rotor, the various signals delivered by the detectors 190 can take up six possible combinations, and each change in the triplet constituted by the states of the detectors 190 corresponds to a determined angular position of the rotor. This makes it possible to determine the angular position of the rotor at precise instants, and to compute the position of the rotor between these instants by interpolation, given knowledge of its speed. The coils 340 can thus be excited in optimum manner with the desired amount of phase shift. The electrical current carried by each coil can thus be reduced to zero and change direction whenever a magnet lies on the axis of the corresponding tooth. Unlike a reluctance motor which operates in attraction only, the above-described motor operates without reluctance both in attraction and in repulsion, and enables a large amount of torque to be generated.

Each detector 190 also has a temperature sensor.

Knowing the temperatures of the coils 340 of the various phases makes it possible to detect possible misfunction of the motor.

On at least one of its end cheek-plates, the rotor 200 has cooling fins 291 which can be seen in FIG. 1, in particular. It will be observed that an additional cooling effect is obtained by the presence of the lobes 235 formed by the pole pieces 230 at the periphery of the rotor, which make it possible to generate a flow of cooling air within the inside of the motor.

The invention is not limited to a synchronous motor and it is also applicable to the manufacture of a generator. The rotor can be internal or external.

The electrical power of the machine can lie in the range 1 kilowatt (kW) to 750 kW, for example. The speed of rotation of the rotor can lie in the range 1000 rpm to 10,000 rpm, for example. A machine of the invention can also find applications when speed is below 1000 rpm. The outside diameter of the machine can lie in the range 50 mm to 1 meter (m), for example; in the most widespread applications, the outside diameter can lie in the range 100 mm to 600 mm.

The invention is not limited to some particular number of poles nor is it limited to the stator being powered with three-phase AC. Electricity can be polyphase having $n_{phases}$ phases, where n is not equal to three.

The teeth of the stator can have a surface directed towards the rotor that is of a shape that is not circularly cylindrical.

The invention is also applicable to a reluctance machine.

What is claimed is:

1. A rotary electric machine including a stator, powered by a polyphase current, having a magnetic circuit with teeth forming intervening slots for receiving electrical conductors, wherein said magnetic circuit comprises an assembly of sectors defining air-gaps intersecting said teeth at half-width, and wherein the number of teeth $n_{teeth}$ is in compliance with the relationship $n_{teeth}=n_{pairs}*n_{phases}$, where $n_{pairs}$ is the number of pairs of poles and $n_{phases}$ the number of phases, wherein the sectors are held together by radial compression forces exerted on the sectors by a cylindrical case.

2. A machine according to claim 1, wherein said sectors each have portions in relief that are capable of cooperating with complementary portions in relief of adjacent sectors.

3. A machine according to claim 1, wherein said stator receives an individual coil on each tooth.

4. A machine according to claim 3, wherein each tooth is of non-constant width.

5. A machine according to claim 1, wherein said teeth do not have pole shoes, and include, in the vicinity of their free end, slots for mounting pieces of locking shim for locking coils engaged on the teeth.

6. A machine according to claim 1, having a rotor, wherein said rotor is a permanent magnet rotor and a flux-concentrating rotor.

7. A machine according to claim 1, wherein each sector is formed by a stack of superposed magnetic laminations.

8. A machine according to claim 1, wherein, when joined together, said sectors form holes designed to receive fixing screws for fixing detectors disposed on said teeth, wherein the machine comprises detectors fixed with said screws.

9. A machine according to claim 1, wherein said current is three-phase.

10. The rotary electric machine of claim 1, wherein the electric power of said machine lies in the range 1 to 750 kW.

11. The rotary electric machine of claim 1, wherein said machine has an outside diameter which lies in the range 100 to 600 mm.

12. A rotary electric machine including a stator, powered by a polyphase current, having a magnetic circuit with teeth forming intervening slots for receiving electrical conductors, wherein said magnetic circuit comprises an assembly of sectors defining air-gaps intersecting said teeth at half-width, and wherein the number of teeth $n_{teeth}$ is in compliance with the relationship $n_{teet}=n_{pairs}*n_{phases}$, where $n_{pairs}$ is the number of pairs of poles and $n_{phases}$ the number of phases, said machine having a rotor, wherein each tooth has opposite sides which diverge going away from said rotor over at least a portion of their length starting from the free ends of the tooth.

13. The rotary electric machine of claim 12, wherein the opposite sides of each tooth diverge going away from the rotor over more than half of their length starting from the free ends of the tooth.

14. A rotary electric machine including a stator, powered by a polyphase current, having a magnetic circuit with teeth forming intervening slots for receiving electrical conductors, wherein said magnetic circuit comprises an assembly of sectors defining air-gaps intersecting said teeth at half-width, and wherein when joined together, said sectors form holes designed to receive fixing screws for fixing detectors disposed on said teeth.

15. A machine according to claim 14, wherein the number of teeth $n_{teeth}$ is in compliance with the relationship $n_{teeth}=n_{pairs}*n_{phases}$, where $n_{pairs}$ is the number of pairs of poles and $n_{phases}$ the number of phases.

* * * * *